United States Patent
Lukes

(10) Patent No.: US 10,416,429 B2
(45) Date of Patent: Sep. 17, 2019

(54) DYNAMIC FOCUS AND ZOOM SYSTEM FOR USE WITH WIDE-FIELD, CONFOCAL AND MULTIPHOTON MICROSCOPES

(71) Applicant: Agile Focus Designs, LLC, Bozeman, MT (US)

(72) Inventor: Sarah Lukes, Bozeman, MT (US)

(73) Assignee: Agile Focus Designs, LLC, Bozeman, MT (US)

( * ) Notice: Subject to any disclaimer, the term of this patent is extended or adjusted under 35 U.S.C. 154(b) by 217 days.

(21) Appl. No.: 15/706,331

(22) Filed: Sep. 15, 2017

(65) Prior Publication Data
US 2019/0086655 A1    Mar. 21, 2019

(51) Int. Cl.
| | |
|---|---|
| *G02B 26/08* | (2006.01) |
| *G02B 21/02* | (2006.01) |
| *G02B 5/04* | (2006.01) |
| *G02B 15/14* | (2006.01) |
| *G02B 7/18* | (2006.01) |
| *G02B 21/24* | (2006.01) |
| *G02B 27/28* | (2006.01) |
| *G02B 21/36* | (2006.01) |

(52) U.S. Cl.
CPC ............ *G02B 21/025* (2013.01); *G02B 5/04* (2013.01); *G02B 7/181* (2013.01); *G02B 15/14* (2013.01); *G02B 21/241* (2013.01); *G02B 21/248* (2013.01); *G02B 26/085* (2013.01); *G02B 27/283* (2013.01); *G02B 21/361* (2013.01); *G02B 21/362* (2013.01)

(58) Field of Classification Search
CPC ........ G02B 21/025; G02B 5/04; G02B 7/181; G02B 15/14; G02B 21/241; G02B 21/248; G02B 26/085; G02B 27/283; G02B 21/361; G02B 21/362; G02B 26/08
USPC ...................................................... 359/201.2
See application file for complete search history.

(56) References Cited

U.S. PATENT DOCUMENTS

| | | | |
|---|---|---|---|
| 7,002,739 B2 * | 2/2006 | Awamura | G02B 21/002 359/224.1 |
| 7,864,996 B2 | 1/2011 | Hemmer et al. | |
| 8,425,037 B2 | 4/2013 | Uhlhom et al. | |

(Continued)

OTHER PUBLICATIONS

Sarah J. Lukes, David L. Dickensheets, Agile scanning using a MEMS focus control mirror in a commercial confocal microscope, Proc. of SPIE, Mar. 12, 2014, pp. 89490W-1 through 89490W-11, vol. 8, International Society for Optics and Phototonics (SPIE).

*Primary Examiner* — Euncha P Cherry

(57) ABSTRACT

A dynamic focus and zoom system with three MEMS mirrors, three prisms, three beam splitters, three fixed lenses and an optical relay, all within a housing. The second prism, first and second fixed lenses, and first beam splitter are aligned linearly along a longitudinal axis of the optical relay. The first and second MEMS mirrors are linearly aligned with one another at a ninety-degree angle to such longitudinal axis. The third MEMS mirror, third fixed lens, third wave plate, third beam splitter and third prism are linearly aligned with one another at a ninety-degree angle to the same longitudinal axis. The third prism abuts up against the center of the optical relay between the first and second fixed lenses and is linearly aligned with the first prism such that the linear alignment of the first and third prisms is parallel to the longitudinal axis of the optical relay.

44 Claims, 13 Drawing Sheets

(56) References Cited

U.S. PATENT DOCUMENTS

| | | |
|---|---|---|
| 8,882,662 B2 | 11/2014 | Charles |
| 9,256,009 B2 | 2/2016 | Theriault et al. |
| 9,492,080 B2 | 11/2016 | Uhlhom et al. |
| 9,602,715 B2 | 3/2017 | Gladnick |
| 9,615,728 B2 | 4/2017 | Charles et al. |
| 9,618,326 B2 | 4/2017 | Hauger et al. |
| 2007/0206275 A1 | 9/2007 | Hemmer et al. |
| 2013/0141782 A1 | 6/2013 | Theriault et al. |
| 2015/0077708 A1 | 3/2015 | Hauger et al. |
| 2017/0013185 A1 | 1/2017 | Gladnick |

* cited by examiner

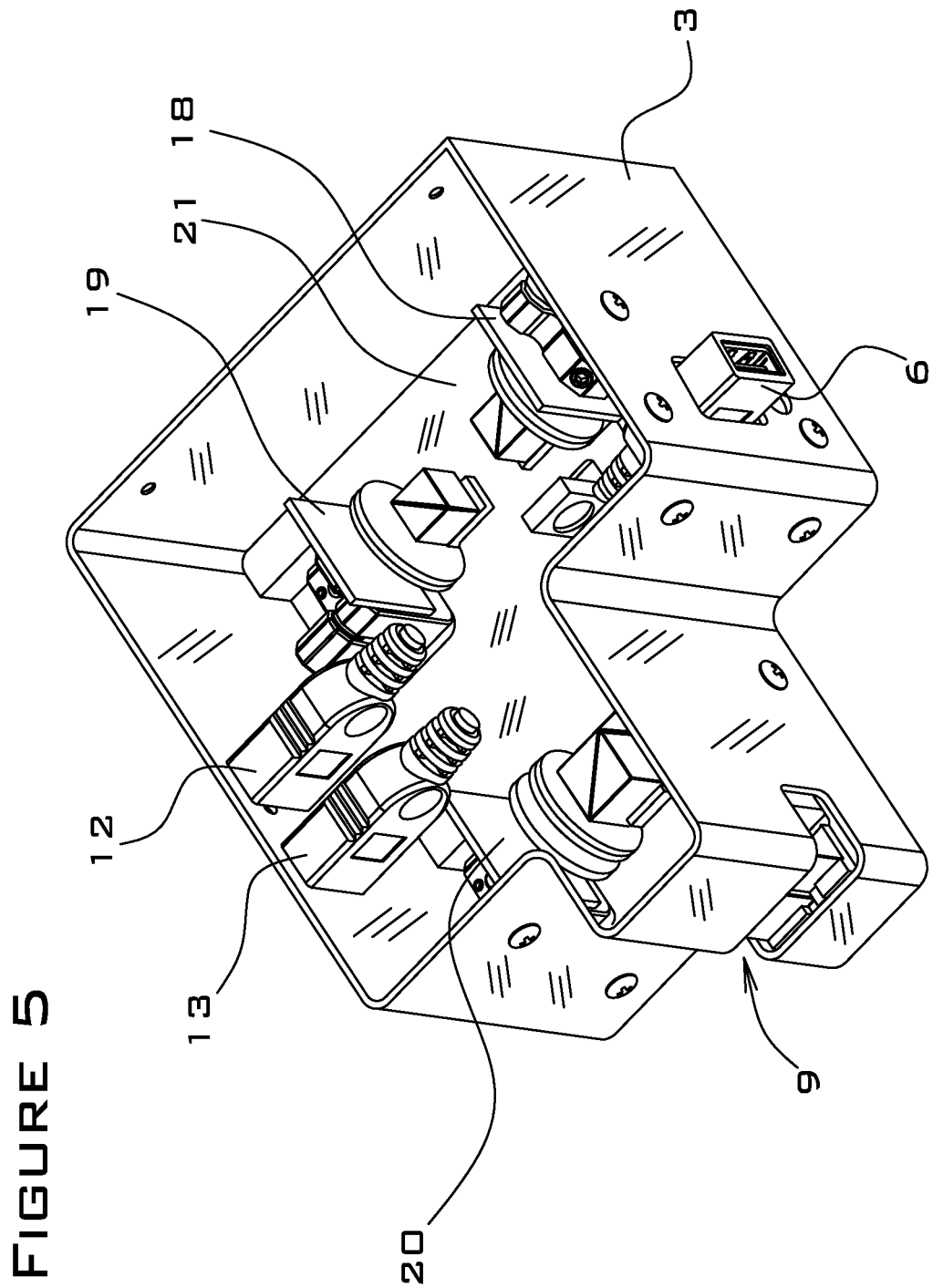

Analysis performed in Zemax

Conditions
0.8 NA water objective with aqueous sample
  v1 is 12 mm in diameter
  v2 and v3 are 6 mm in diameter
  v3 is imaged onto back focal plane of objective lens Note: Total change in focus in the sample increases with decreasing numerical aperature. So, it would be greater with the same conditions and a 0.2 NA objective lens.

DYNAMIC FOCUS AND ZOOM SYSTEM FOR USE WITH WIDE-FIELD, CONFOCAL AND MULTIPHOTON MICROSCOPES

STATEMENT REGARDING FEDERALLY SPONSORED RESEARCH OR DEVELOPMENT

This invention was made with government support under Contract No. 1548737 awarded by the National Science Foundation on Jan. 1, 2016. The government has certain rights in the invention.

BACKGROUND OF THE INVENTION

1. Field of the Invention

The present invention relates generally to the field of microscope technology and, more specifically, to a dynamic focus and zoom system for use with wide-field, confocal and multiphoton microscopes.

2. Description of the Related Art

People who work with microscopes on a daily basis generally assume that they consist of a few translatable or rotational (rotating in/out) fixed focal length lenses or that different objective lenses need to be used to achieve a change in magnification. Furthermore, it is assumed that focusing is done by translating the sample stage up and down to alter the distance between sample and objective lens. As an alternative to translating lenses, single-element, variable-power/variable-focus/varifocus (these terms are used synonymously here) optical elements perform fast focusing like the human eye. They remain stationary as their focal length changes. Three varifocus lenses allow both magnification and focus to be changed independently of one another, and they also allow for a greater range of focus than use of a single varifocus lens. Varifocus lenses include both transmissive and reflective lenses (mirrors), which behave the same except for the direction in which the light travels after hitting their surfaces. The present invention incorporates varifocus lenses into a device that can be used with or attached to a microscope to overcome the disadvantages of conventional microscopes.

Micro-electro-mechanical systems (MEMS) deformable mirrors are reflective lenses with variable focal length. With electrostatic MEMS mirrors, voltage is applied directly to them for fine control of their surface shape. MEMS mirrors are commonly, but not exclusively, made of a photosensitive polymer, SU-8 2002, and a metal such as aluminum, gold or silver (which provides the reflective surface). In the context of the present invention, the MEMS mirrors may be made of silicon nitride in lieu of SU-8 2002, with a titanium dioxide or a metal/oxide reflective surface. As the radius of the curvature of the mirror decreases with increasing voltage, the location of the object (that is being viewed) changes. The capability for these types of MEMS mirrors to replace magnifiers or perform significant focusing has only become possible in approximately the last five years. These advancements came from improved microfabrication techniques and structural changes to the mirrors.

When imaging under a bench top microscope, the sample stage must be translated to change focus. For this reason, most samples are thin, un-living, and fixed. As stated previously, traditional focusing and zoom mechanisms include technologies that rotate fixed focal length lenses and/or translate the sample or fixed focal length lenses. Disadvantages of traditional focusing mechanisms include agitation of the sample with translation of the stage (which can result in difficulty finding focus when observing solid particulates in liquids, damage to samples when they accidentally hit the objective lens, slow focus control (typically less than 100 Hz speed even with automated stages), inaccurate focusing, excessive photodamage from overexposure, early termination of experiments due to reaction completion prior to observation (due to the excessive time it takes to find a focal plane of interest), and the inability to observe biological phenomenon at small timescales due to speed-of-imaging limitations, such as observation of neurons propagating in real-time in living samples. Automated sample stages are limited to discrete focus step locations and traditional zoom systems to discrete magnification changes. To do high-speed imaging, a resonant speed objective lens scanner can quickly translate the objective lens up and down. Resonant objective lens scanners do not maintain optical resolution over the focusing range, operate only at a single (relatively fast) speed, and have a moving mass, which causes them to vibrate or shake the system as they resonate.

Although varifocus lenses (including MEMS mirrors) have been used in connection with some confocal and multiphoton microscopes to achieve greater focus, they have not been used for optical zoom in microscopy, nor have they been incorporated into a small and portable unit that is user-friendly for the common biologist. Commercial varifocus lenses are difficult to use for the average biologist; for example, most dynamic focusing mechanisms that are situated at the beginning of the optical train in a microscope require installation by an engineer. These are usually custom jobs with a single varifocus element done at elite universities for one experiment only, thereby precluding widespread use. Liquid lenses, which are another form of varifocus lens, do not maintain optical resolution over the focusing range, are not achromatic, and cannot effectively control attendant spherical aberration.

The preceding paragraph addresses some of the challenges that exist with current varifocus lens technologies; as stated above, there is no existing technology that utilizes varifocus lenses to achieve optical zoom in microscopy. It is difficult to switch from low magnification of a large area to high magnification of a small area while concurrently manipulating a sample with one's hands. For instance, during excised patch-clamp techniques, a sample remains viable for up to 30 minutes. A scientist must view an entire cell, remove a small portion of the cell membrane with the tip of a glass electrode, turn the objective lens turret to double the magnification, and observe the excised tissue on the tip of the glass electrode by refocusing. The present invention would allow a scientist to observe the entire cell membrane at both low and high magnification while keeping his or her hands free (through the use of voice activation or a foot step button). There is currently no solution for fast optical focusing or zoom that is easily used with (or attached to) a microscope. The present invention maintains the resolution of the system over the focus range, allows for variable speed focusing, and allows the sample to remain stationary.

A number of patents exist for various improvements to microscopes; however, none of these inventions incorporates the structural features or functional improvements of the present invention. Although not directly relevant to the present invention, some are referenced here briefly for the purpose of illustrating the direction in which improvements to magnification systems has evolved. A small subset of these inventions are in the form of attachments to microscopes. For example, U.S. Pat. No. 7,864,996 (Hemmer et al., 2011) discloses a tissue attachment device in which the macroscopic imager and confocal imager are each individually presented to the tissue in a predefined alignment such that imaging locations of the confocal imager with respect to the tissue surface spatially correlate with the macroscopic image. In this invention, a turret rotates and switches between macroscopic and microscopic objective lenses, whereas in the present invention, magnification is changed by altering voltages across the stationary MEMS mirrors. The present invention has no translation or moveable parts or motor to drive moveable parts, which constitutes a significant structural difference as compared to Hemmer and other similar microscopes. Furthermore, as opposed to switching between two separate instruments to switch from macroscopic to microscopic (confocal) imaging, the present invention has one stationary unit that changes magnification by altering voltages on MEMS mirrors.

U.S. Pat. No. 8,425,037 (Uhlhorn et al., 2013) and U.S. Pat. No. 9,492,080 (Uhlhorn et al., 2016) provide an optical coherence tomography (OCT) system that may be coupled to an operation microscope so that a surgeon can visualize ocular structures like the human crystalline lens and other ocular structures such as the cornea and/or vitreous while surgical instruments are in the field of view. As with the previously referenced invention, this particular invention does not attempt to solve the same problems as the present invention, is not structurally similar to the present invention, and does not have the same application as the present invention. Both the OCT and spectrometer described in these patents have an Interferometer. An interferometer has two paths of light that recombine and interfere. The present invention has one path of light going forward and one path returning. There is no recombination of the two paths. Unlike the present invention, the Ulhorn invention is not a MEMS device that operated under an applied voltage. Rather, the surgical microscope has a fixed focal length and is used to visually find a specific location in the eye, at which point the entire instrument is locked into place, and the imaging is done via OCT. The change in OCT focusing is accomplished by altering the optical pathlength of the interferometer.

U.S. Pat. No. 9,256,009 (Theriault et al., 2016) discloses a microscope that incorporates a tunable acoustic gradient index of refraction (TAG) lens, which is a type of variable focal length lens, proximate to the microscope stage and a pulsed illuminator capable of illuminating the stage and synchronously pulsed with an operating frequency of the TAG lens. One of the objects of this invention is to overcome the slow switching speeds of spatial light modulators. The invention is directed primarily toward improving throughput for materials processing applications. In Theriault, the lens is piezoelectrically driven; by contrast, the MEMS mirrors of the present invention are electronically driven (by voltage only). Theriault's lens consists of two transparent windows and is filled with a refractive material (gas, solid, liquid, plasma, etc.). Light transmits through the lens and is not reflected as with a MEMS mirror. Theriault uses a single lens to accomplish both magnification and focusing, whereas the present invention uses three MEMS mirrors to perform these functions. One drawback of Theriault's single lens is that it requires a pulsed laser or camera and an iris for focusing, none of which is necessary in the present invention.

U.S. Pat. No. 9,602,715 (Gladnick, 2017) discloses an imaging system that is comprised of a variable magnification lens portion and a variable focal length lens (TAG lens) portion. This particular invention is intended to be used in a precision machine vision inspection or metrology system. It is not structurally or functionally similar to the present invention but does represent an improvement in magnification technology. The Gladnick invention uses interchangeable lenses to change magnification states, similar to Hemmer (discussed above). Interchangeable lenses for magnification results in discrete magnification states. The electronically controlled variable focus MEMS mirrors of the present invention, on the other hand, allow for continuous magnification changes from one (minimum) magnification state to another (maximum). According to Gladnick, his transmissive TAG lens operates at two discrete constant resonant frequencies that correspond with the two magnification states. The MEMS mirrors of the present invention operate over a broad and continuous range of frequencies from DC to 1 kHz. The present invention fills the back aperture of the objective lens for all magnifications and focusing. Gladnick's invention does not fill the back aperture of the objective lens, as an iris alters the size of the back aperture of the objective lens for each magnification state of their design.

Significantly, none of the above inventions uses MEMS mirrors to provide dynamic focusing and zoom in widefield, confocal and multiphoton microscopes. With the exception of the present invention, there is no such system that is configured as a single, portable unit and designed for ease of use by a scientist in the lab. The benefits of MEMS mirrors include the fact that they typically have significantly more focus range and higher bandwidth, they are less sensitive to temperature, and they are achromatic for fluorescence applications.

In an article published in 2014,[1] the contents of which are incorporated herein by reference, the inventor of the present invention contemplated that variable-power/variable-focus optical elements (in the form of a single MEMS mirror) might be incorporated into microscope technology, but the details of the dynamic focus and zoom system provided herein have not heretofore been disclosed. Specifically, the 2014 paper did not address the use of three MEMS mirrors, aligned as described herein, to accomplish independent adjustment of focusing and zoom. The basic structure of the MEMS mirror itself is discussed in the 2014 article.

BRIEF SUMMARY OF THE INVENTION

The present invention is a dynamic focus and zoom system for use with wide-field, confocal and multiphoton microscopes comprising: a first MEMS mirror, a second MEMS mirror, and a third MEMS mirror situated within a housing; a first universal serial bus that is situated proximate to and configured to provide a drive signal to the first MEMS mirror, a second universal serial bus that is situated proximate to and configured to provide a drive signal to the second MEMS mirror, and a third universal serial bus that is situated proximate to and configured to provide a drive signal to the third MEMS mirror; at least one printed circuit board that is configured to control the first MEMS mirror, the second MEMS mirror, and the third MEMS mirror; a first prism and a second prism that is situated adjacent to the first prism; an optical relay comprised of a first fixed lens and a second fixed lens, the optical relay being situated directly behind the second prism; a first beam splitter that is situated directly behind the second fixed lens; and a second beam splitter that is situated in front of the second MEMS mirror; wherein the second prism, the first fixed lens, the second fixed lens, and the first beam splitter are aligned linearly along a longitudinal axis of the optical relay; and wherein the first MEMS mirror and the second MEMS mirror are linearly aligned with one another at a ninety-degree angle to the longitudinal axis of the optical relay.

In a preferred embodiment, the housing comprises a top cover having a plurality of air vents for heat dissipation. Preferably, the housing comprises a main window that is configured to allow a light beam to access the first prism and the second prism by passing through the main window. The housing is preferably configured to form a first alcove sized to allow an objective lens to access a first side of the main window and a second alcove sized to allow an objective lens turret to access a second side of the main window. In an alternate embodiment, the housing is preferably configured to form a first alcove sized to allow an objective lens to access a first side of the main window and a second alcove sized to allow a camera to access a second side of the main window. In an alternate embodiment, the housing is configured to form a first alcove sized to allow an objective lens to access a first side of the main window and a second alcove sized to allow an eyepiece to access a second side of the main window.

In a preferred embodiment, the first fixed lens and the second fixed lens are slidably mounted within a slot in a floor of the housing. Preferably, the third MEMS mirror is situated proximate to the main window. The invention preferably comprises a third fixed lens. In one embodiment, the invention further comprises a first wave plate that is situated between the first beam splitter and the first MEMS mirror and a second wave plate that is situated between the second beam splitter and the second MEMS mirror. In another embodiment, the invention further comprises a third wave plate that is situated directly in front of the third fixed lens. In yet another embodiment, the invention further comprises a third beam splitter that is situated directly in front of the third wave plate and a third prism that is situated directly in front of the third beam splitter.

In a preferred embodiment, the third MEMS mirror, the third fixed lens, the third wave plate, the third beam splitter and the third prism are linearly aligned with one another at a ninety-degree angle to the longitudinal axis of the optical relay. Preferably, the third prism abuts up against a center section of the optical relay between the first fixed lens and the second fixed lens, and the third prism is linearly aligned with the first prism such that the linear alignment of the first prism and the third prism is parallel to the longitudinal axis of the optical relay. In one embodiment, the third fixed lens is situated directly in front of the third MEMS mirror. In another embodiment, the third fixed lens is positioned between the first prism and the third prism. In yet another embodiment, the third fixed lens is positioned between the second beam splitter and the third beam splitter.

In a preferred embodiment, the first beam splitter, the second beam splitter, and the third beam splitter are polarizing beam splitters. Preferably, there is a first distance between the first MEMS mirror and the second MEMS mirror, there is a second distance between the second MEMS mirror and the third MEMS mirror, and the first distance is less than the second distance. The first alcove preferably comprises a first threaded adapter that is integral to the housing and configured to receive an objective lens. The second alcove preferably comprises a second threaded adapter that is integral to the housing and configured to receive an objective lens turret, a camera or an eyepiece.

BRIEF DESCRIPTION OF THE DRAWINGS

FIG. 5 is the same view as that shown in FIG. 4 except with the spacers and mount plates removed.

REFERENCE NUMBERS

Figure 1:
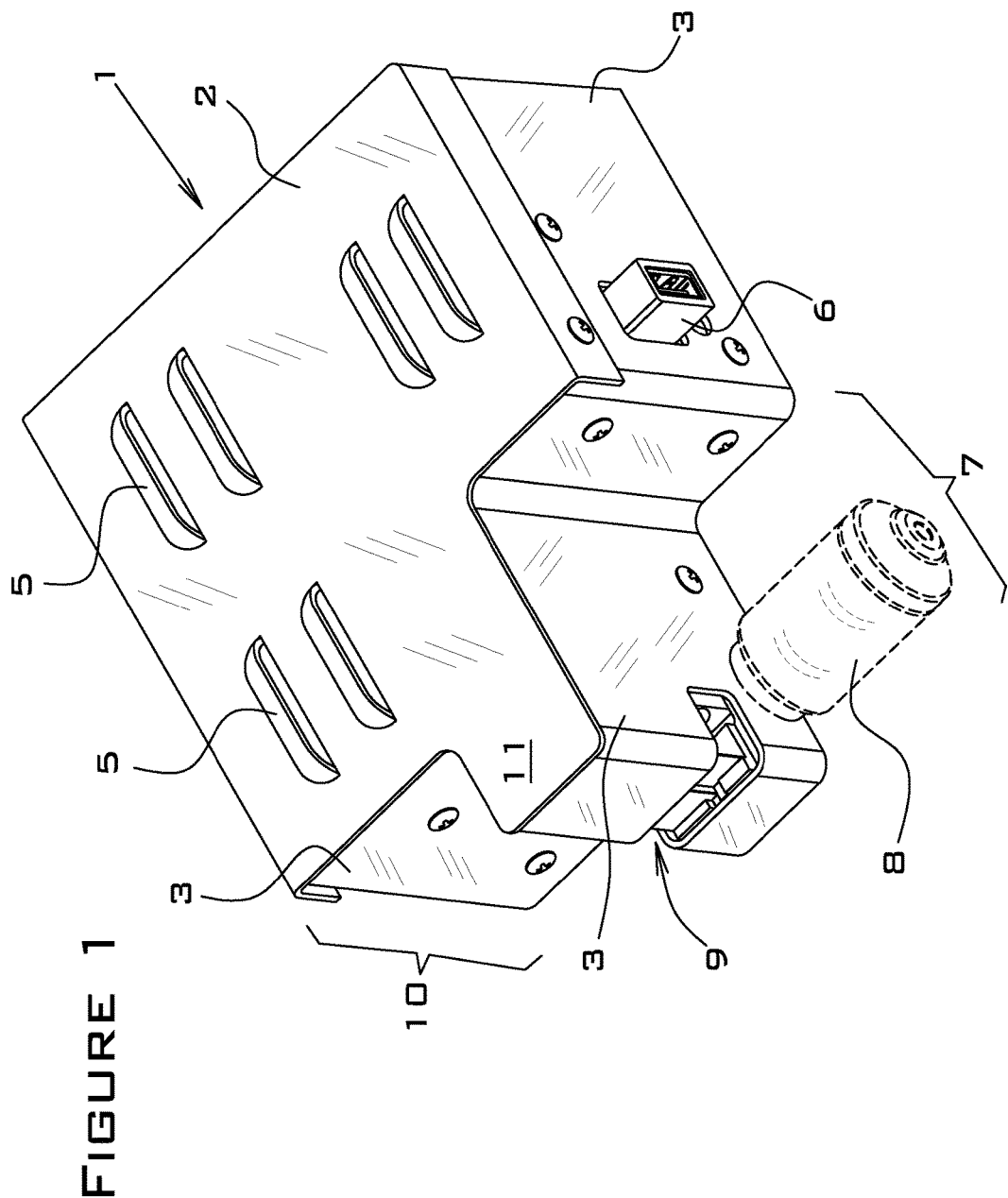
FIG. 1 is a first perspective view of a first embodiment of the present invention.

1 Housing
2 Top cover (of housing)
3 Side wall (of housing)
4 Floor (of housing)
5 Air vent (in top cover)
6 First USB
7 First alcove
8 Objective lens
9 Main window
10 Second alcove
11 Extension (in housing)
12 Second USB
13 Third USB
14 Printed circuit board
15 Spacer
16 Mount board
17 Hole (in mount board)
18 First MEMS mirror
19 Second MEMS mirror
20 Third MEMS mirror
21 Interior platform
22 Hole (in interior platform)
23 First prism
24 Second prism
25 First fixed lens
26 Second fixed lens
27 Slot
28 First beam splitter
29 Wave plate
30 Second beam splitter
31 Third fixed lens
32 Third beam splitter
33 Third prism
34 First threaded adapter
35 Second threaded adapter

DETAILED DESCRIPTION OF INVENTION

A. Overview

The present invention is comprised of a mechanical enclosure or housing that easily inserts into or attaches to existing widefield, confocal or multiphoton microscopes at an infinite conjugate image plane. The invention is specifically designed to be situated between the objective lens turret and the objective lens, but it could also be placed near the eyepiece and function equivalently. Within the housing, three electronically controlled variable focus lenses and one fixed lens perform significant defocusing and zoom. Through experimentation, the inventor determined that one MEMS mirror allows focusing but no zoom, two MEMS mirrors allow focusing and zoom but are dependent on each other (focusing cannot be changed without changing the zoom/magnification properties and vice versa), and three mirrors allow independent focusing and zoom (that is, either can be changed without affecting the other). Furthermore, the present invention allows for a change in magnification of the microscope without turning the microscope objective lens turret to switch objectives, and the sample remains stationary and un-agitated.

As the invention alters the focus position within the sample, the back focal plane of the objective lens remains filled. Thus, the numerical aperture or resolution of the system remains constant, unlike other fast focusing technologies available. The invention alters defocus independently of zoom. Furthermore, the invention can alter optical (as opposed to digital that does not improve resolution) magnification independently of focus.

B. Detailed Description of the Figures

FIG. 1 is a first perspective view of a first embodiment of the present invention. As shown in this figure, the present invention is comprised of a housing that forms an enclosure around the other components of the invention. The housing has a top cover 2, side walls 3 and floor (not shown). The top cover 2 may be attached, secured or connected to or joined with the side walls 3 in any manner; although shown here as attached to the side walls 3 with screws, the present invention is not limited to this particular manner of attaching the top cover 2 to the side walls 3. In an alternate embodiment, the top cover 2 and side walls 3 may be integrally molded (part of the same part) or welded together. The housing 1 may be made of any suitable, durable and rigid material (such as aluminum). In a preferred embodiment, the top cover 2 is comprised of one or more air vents 5 for heat dissipation.

FIG. 1 also shows the first USB 6. In this invention, there is one USB for each of the three MEMS mirrors (not shown). The housing 1 is preferably configured to form a first alcove 7 sufficient in size and shape to allow the objective lens 8 to access a first side of a main window 9 and a second alcove 10 sufficient in size and shape to allow the objective lens turret or camera/eyepiece (not shown) to access a second side of the main window 9. The top cover 2 and floor 4 (see FIG. 5B) of the housing 1 are preferably flat, and the side walls are situated between the top cover 2 and floor 4 and perpendicular to each of them. The two alcoves 7, 10 form an extension 11 of the housing 1 in which the main window 9 is situated. The main window 9 extends across the entire front end of the extension 11 and wraps around both sides of the extension 11 to allow the objective lens 8 and objective lens turret (not shown) to access the main window 9 from opposite sides of the window (so that the objective lens and objective lens turret are longitudinally aligned with one another).

Figure 2:
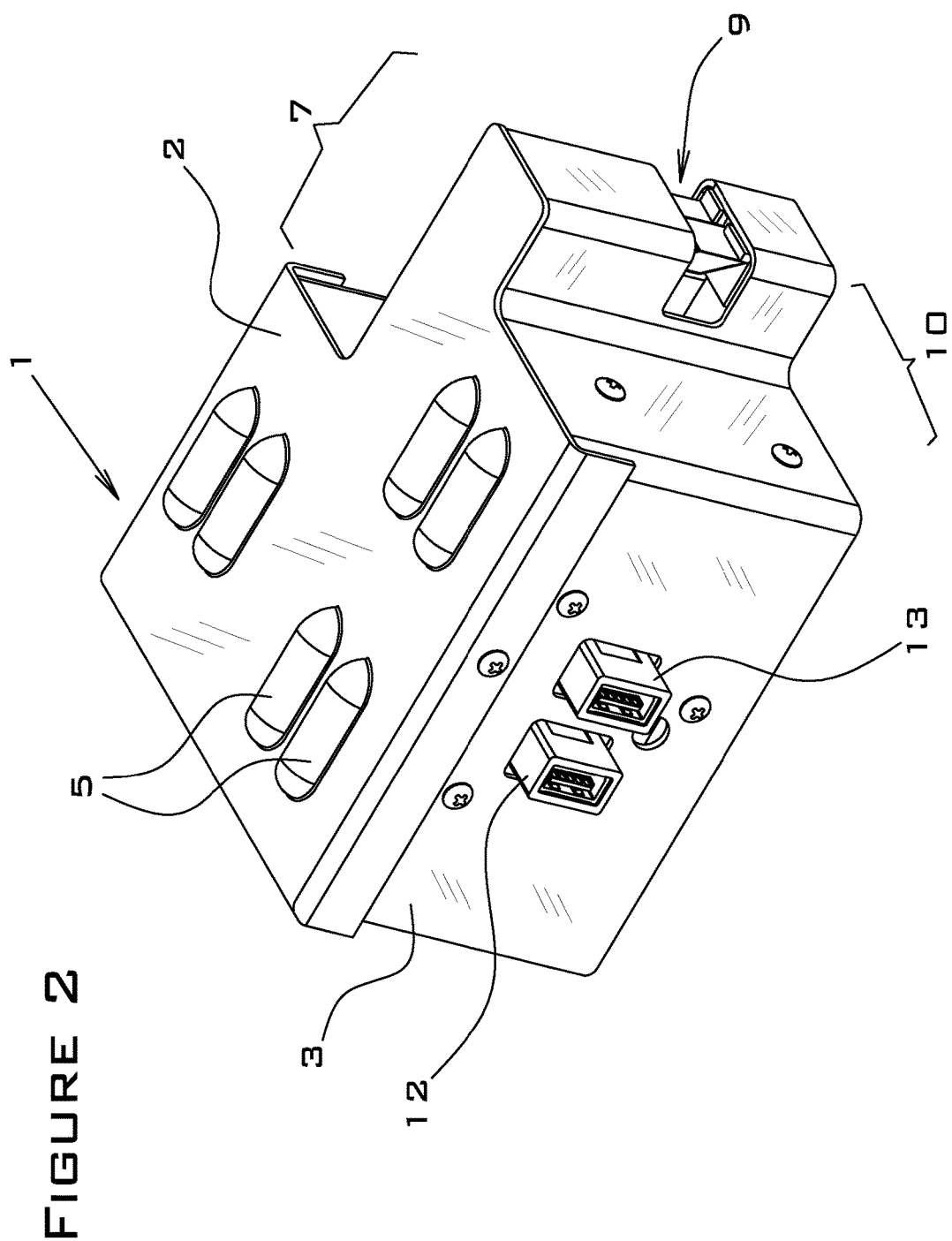
FIG. 2 is a second perspective view of a first embodiment of the present invention.

FIG. 2 is a second perspective view of a first embodiment of the present invention. This figure shows the second and third USBs 12, 13, respectively, corresponding to the second and third MEMS mirrors (not shown). Note that all three USBs 6, 12, 13 extend through cut-outs in the side walls 3 of the housing 1. Each USB is situated proximate to a MEMS mirror inside of the housing (see FIG. 5) and provides the drive signal for one of the three MEMS mirrors. A printed circuit board 14 corresponds to each of the three MEMS mirrors (see FIG. 3), and the power for each printed circuit board is supplied through a hole in the housing below the USB (see, e.g., FIG. 7).

Figure 3:
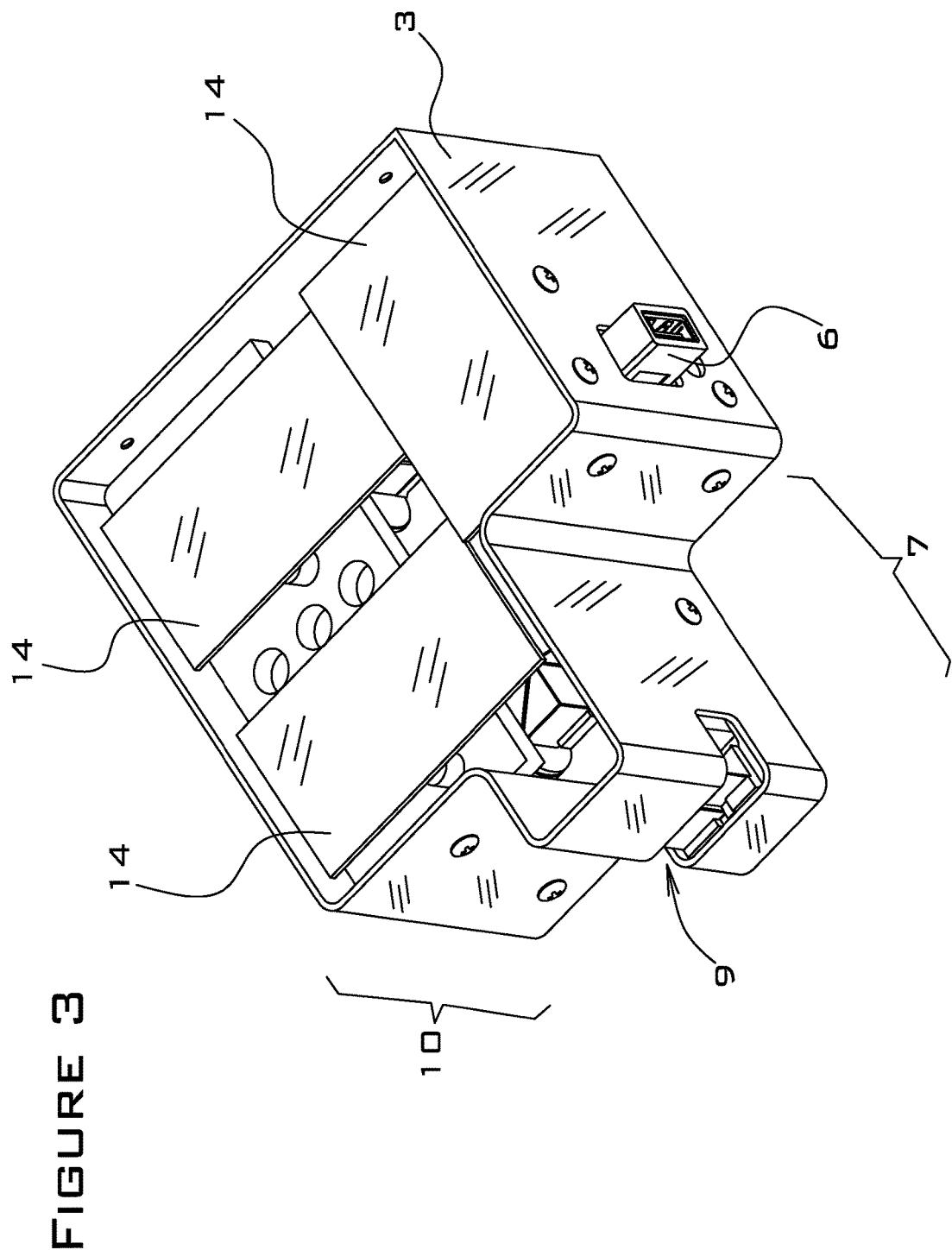
FIG. 3 is the same view as that shown in FIG. 1 except with the top cover of the housing removed.

FIG. 3 is the same view as that shown in FIG. 1 except with the top cover of the housing removed. This figure shows three printed circuit boards 14, each of which controls a MEMS mirror (see FIG. 5). In future embodiments, it may be possible to control all three MEMS mirrors with a single printed circuit board.

Figure 4:
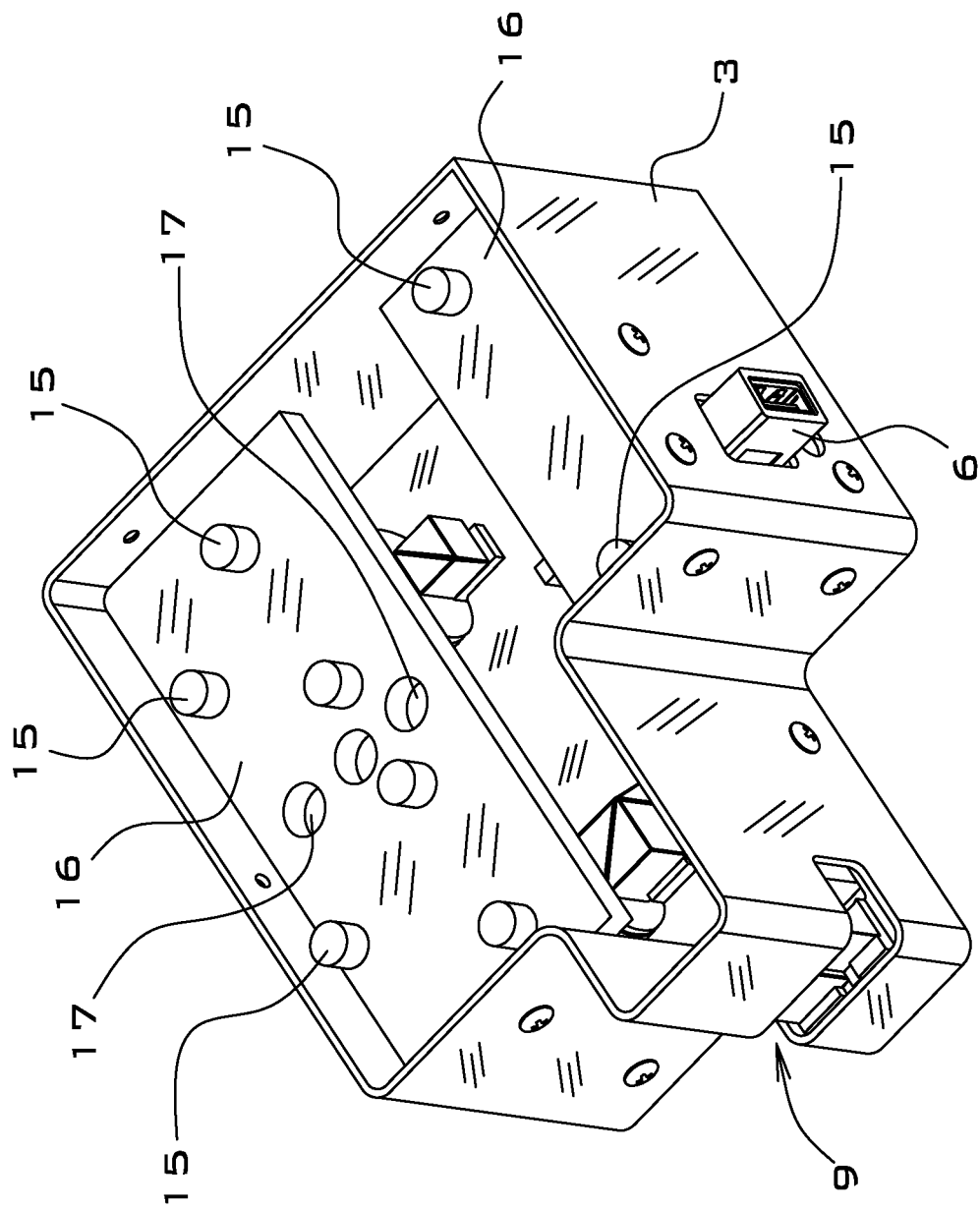
FIG. 4 is the same view as that shown in FIG. 3 except with the printed circuit boards removed.

FIG. 4 is the same view as that shown in FIG. 3 except with the printed circuit boards removed. As shown in this figure, a plurality of spacers 15 are preferably situated on top of one or more mount boards 16 between the mount boards 16 and the printed circuit boards 14. The mount boards 16 are situated beneath the printed circuit boards 14, and the purpose of the spacers 15 is to ensure that the printed circuit boards 14 do not come into electrical contact with the mount boards 16. Holes 17 in the mount board 16 allow electrical wiring to pass through the mount board 16 to the printed circuit boards 14 from the USBs 13 below.

FIG. 5 is the same view as that shown in FIG. 4 except with the spacers and mount plates removed. As shown in this figure, the invention comprises three MEMS mirrors 18, 19, 20, all of which are preferably circular. (In FIG. 5, part numbers 18, 19 and 20 are shown as small, square printed circuit boards with the circular mirrors adhered to them with tape or epoxy.) The invention preferably comprises an interior platform 21 that allows the various optical components to be aligned properly.

Figure 5A:
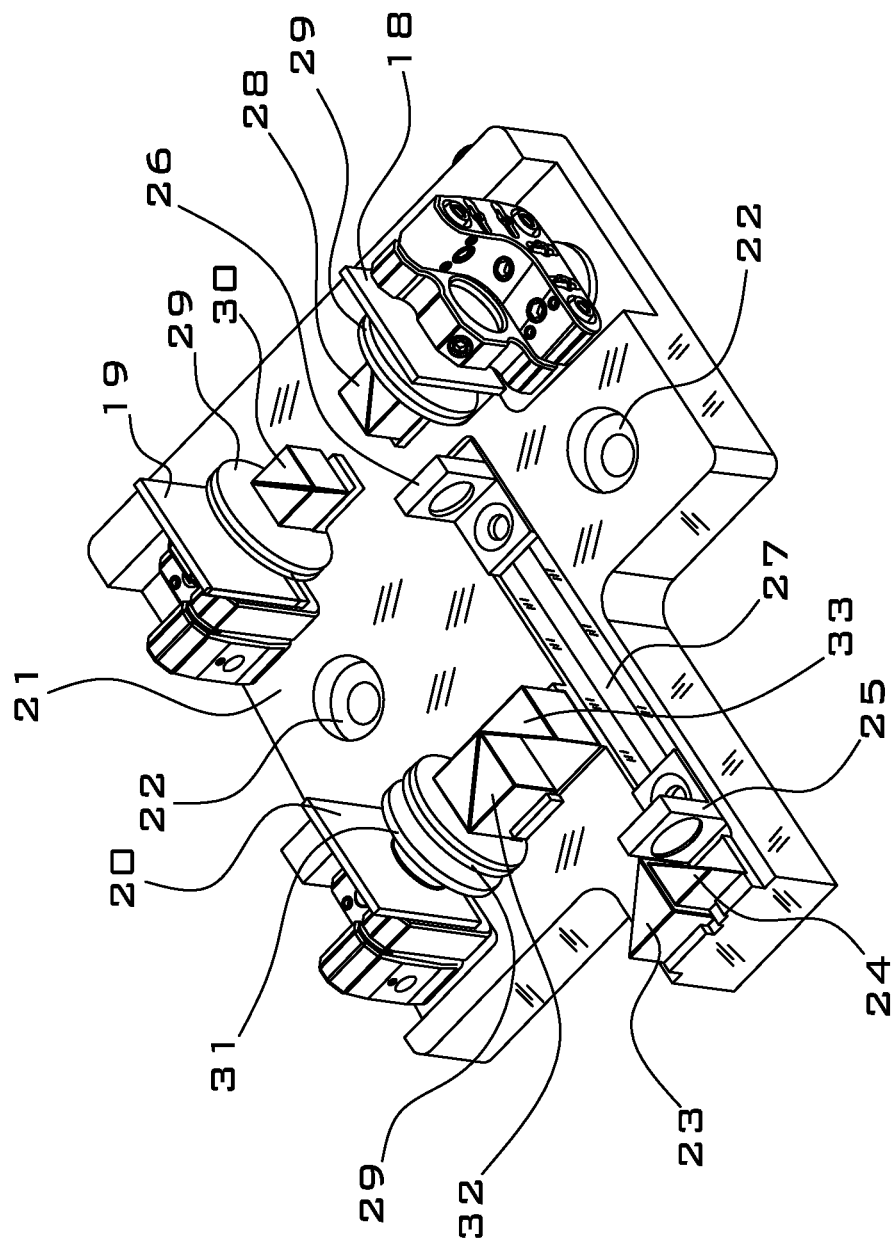
FIG. 5A is the same view as that shown in FIG. 5 except with the side walls of the housing and universal serial buses (USBs) removed.
Figure 5B:
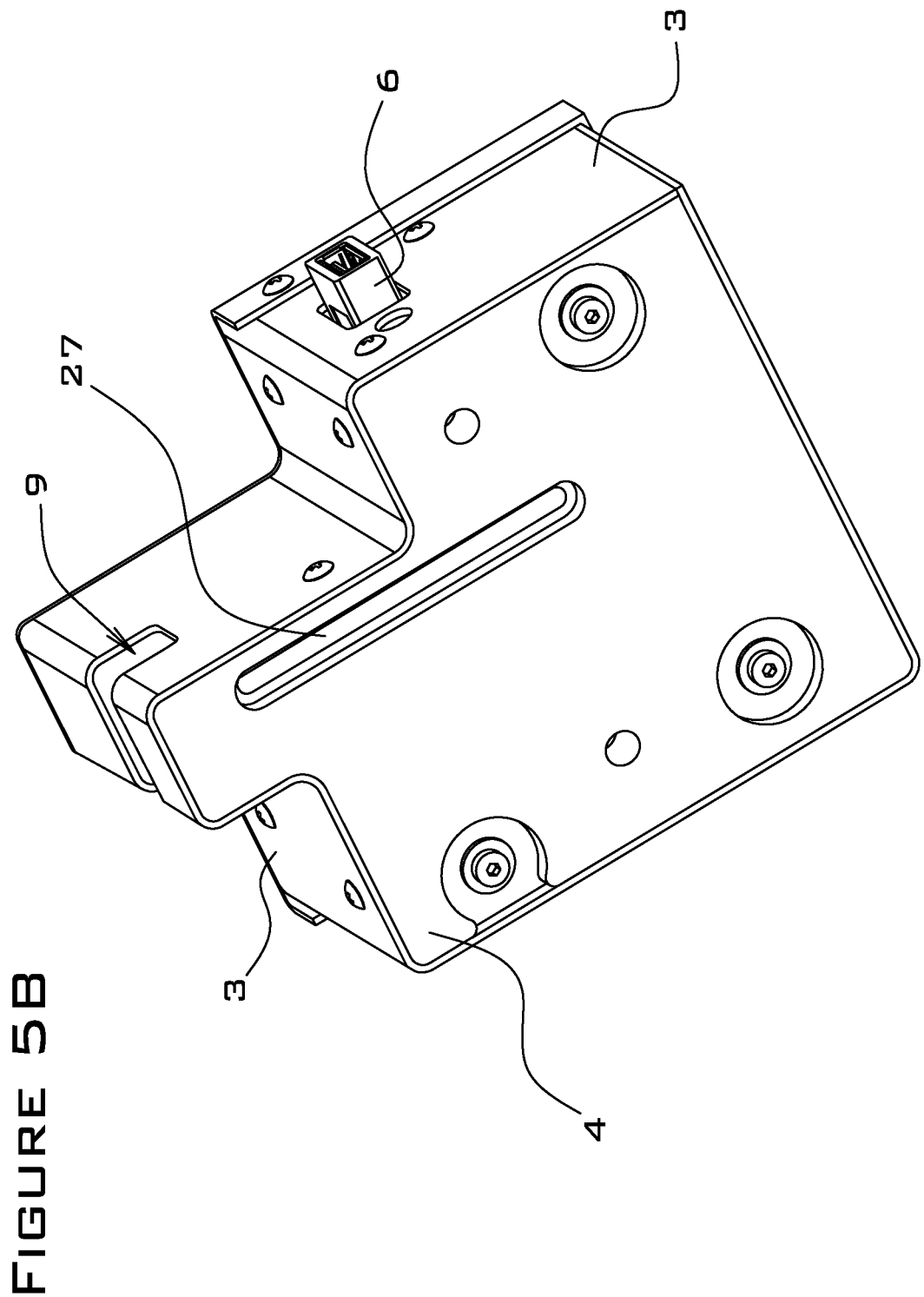
FIG. 5B is a bottom perspective view of the first embodiment of the present invention.

FIG. 5A is the same view as that shown in FIG. 5 except with the side walls of the housing and USBs removed. Note that one or more holes 22 in the interior platform 21 allow the invention to be secured to an optical bench with screws. As shown in this figure, a first prism 23 and a second prism 24, which is adjacent to the first prism 23, are situated just inside of the main window 9. Although not shown here, the main window 9 may be covered with glass or similar transparent material. Directly behind the second prism 24 is an optical relay comprised of a first fixed lens 25 and a second fixed lens 26. The first and second fixed lenses are preferably slidably mounted within a slot 27 in the floor 4 of the housing 1 and fixed in place with set screws (not shown) so that the distance between them can be adjusted.

Situated directly behind the second fixed lens 26 is a first beam splitter 28. The first beam splitter 28 is situated so that the second prism 24, first fixed lens 25, second fixed lens 26, and first beam splitter 28 are all aligned linearly along the longitudinal axis of the optical relay. A wave plate 29 is situated between the first beam splitter 28 and the first MEMS mirror 18. The first and second MEMS mirrors 18, 19 are linearly aligned with one another at a ninety-degree angle to the longitudinal axis of the optical relay. A second beam splitter 30 is situated in front of the second MEMS mirror 19, and a wave plate 29 is situated between the second beam splitter 30 and the second MEMS mirror 19.

The third MEMS mirror 20 is situated proximate to the main window 9. A third fixed lens 31 is situated directly in front of the third MEMS mirror 20, and a wave plate 29 is situated directly in front of the third fixed lens 31. The present invention was designed to be as small as possible so that it could be attached to existing microscopes without significant bulk. In a preferred embodiment, the addition of the third fixed lens 31 (positive fixed focal length lens) made it possible to keep the length or the primary optical elements under four inches. In an alternate embodiment, the third fixed lens 31 is positioned between the first prism 23 and the third prism 33. In another alternate embodiment, the third fixed lens 31 is positioned between the second beam splitter 30 and the third beam splitter 32. The third fixed lens 31 would have a different focal length depending on where it is placed, but this focal length may be calculated using the equations set forth below.

Referring to FIG. 5A, a third beam splitter 32 is situated directly in front of the wave plate 29 that is in front of the third fixed lens 31, and a third prism 33 is situated directly in front of the third beam splitter 32. The third MEMS mirror 20, third fixed lens 31, wave plate 29, third beam splitter 32, and third prism 33 are all linearly aligned with one another at a ninety-degree angle to the longitudinal axis of the optical relay. The third prism 33 abuts up against a center section of the optical relay (between the two fixed lenses 25, 26) and is also linearly aligned with the first prism 23 such that the linear alignment of these two prisms is parallel to the longitudinal axis of the optical relay. The first, second and third beam splitter 28, 30 are all preferably polarizing beam splitters. In a preferred embodiment, the distance between the first and second MEMS mirrors 18, 19 is less than the distance between the second and third MEMS mirrors 19, 20. This configuration is also shown in FIG. 6.

Figure 6:
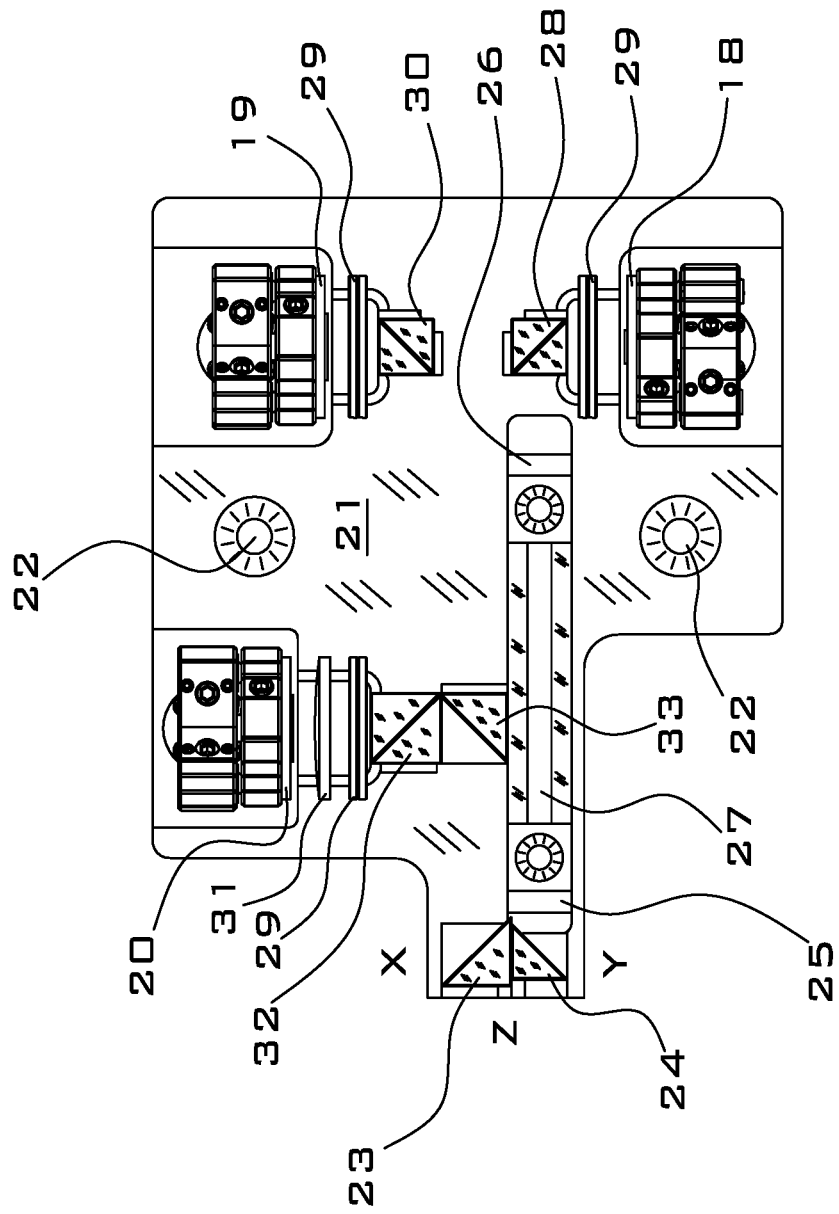
FIG. 6 is a top view of the embodiment shown in FIG. 5A.

FIG. 6 is a top view of the embodiment shown in FIG. 5A. Microscopes can be used with transmissive illumination and reflective illumination (where light travels forwards through the system and reflects back through it to the camera/eyepiece for viewing). With the present invention, the camera/eyepiece and the objective lens can be placed in a few different locations. In one possible configuration, the camera/eyepiece (or objective lens turret) is placed at position "X" on FIG. 6, and the objective lens (which provides a source of illumination for transmission) is situated at position "Y" (see also FIG. 1). Alternately, the camera/eyepiece may be placed at position "Z" with the objective lens at position "Y"; in this configuration, the first prism 23 is removed. In yet another configuration, the camera/eyepiece is at position "X," and the objective lens is at position "Z"; in this configuration, the second prism 24 is removed. In all of these configurations, the camera/eyepiece may provide a source of illumination for reflection. For purposes of the succeeding paragraphs, we will refer to these three configurations as "Configuration A," "Configuration B," and "Configuration C," respectively.

In Configuration A, light travels from the objective lens 8 through the main window 9 and hits the second prism 24, which is at a forty-five degree angle to the incoming bean of light. The light beam is then directed through the first fixed lens 25 and the second fixed lens 26 and hits the first beam splitter 28. Light then travels through the wave plate 29 and hits the first MEMS mirror 18, where it is reflected back through the first beam splitter 28 and into the second beam splitter 30. The light beam then travels through the wave plate 29 in front of the second MEMS mirror and hits the second MEMS mirror 19, where it is reflected back through the wave plate 29 and back into the second beam splitter 30.

The light beam is then directed perpendicularly from the second beam splitter 30 to the third beam splitter 32. Light then travels through the wave plate 29 in front of the third MEMS mirror 20, through the third fixed lens 31, and onto the third MEMS mirror 20. The light beam is then reflected back through the third fixed lens 31, wave plate 29, and third beam splitter 32 and hits the third prism 33, which directs the light beam to the first prism 23, through the side of the main window 9, where it exits the device at position "X." All three of the prisms 23, 24, and 33 are configured so that the incoming light beam hits the prism at a forty-five-degree angle and is redirected at a ninety-degree angle relative to its incoming direction.

As the light rays hit MEMS mirrors 18, 19 and 20, there is an opportunity to affect magnification and/or focus at each of these three points via the software that controls the defocus and spherical aberration of the three MEMS mirrors. In a preferred embodiment, the first MEMS mirror 18 is mapped directly to the back focal plane of the objective lens with a 1:1 correction ratio. In a preferred embodiment, the third MEMS mirror 20 has a larger beam diameter than the other two MEMS mirrors 18, 19 to effectuate greater magnification.

In Configuration B, the path of light is the same as described above for Configuration A, except that with the removal of the third prism 33, light exits the device at position "Z" on FIG. 6. In this configuration, the camera/eyepiece is perpendicular to the objective lens 8. In Configuration C, the camera/eyepiece is also perpendicular to the objective lens 8, but the second prism 24 is removed rather than the first prism 23. The path of light is the same as described above for Configuration A, except that light enters the device through the front of the main window 9 and hits the first fixed lens 25 of the optical relay.

Figure 7:
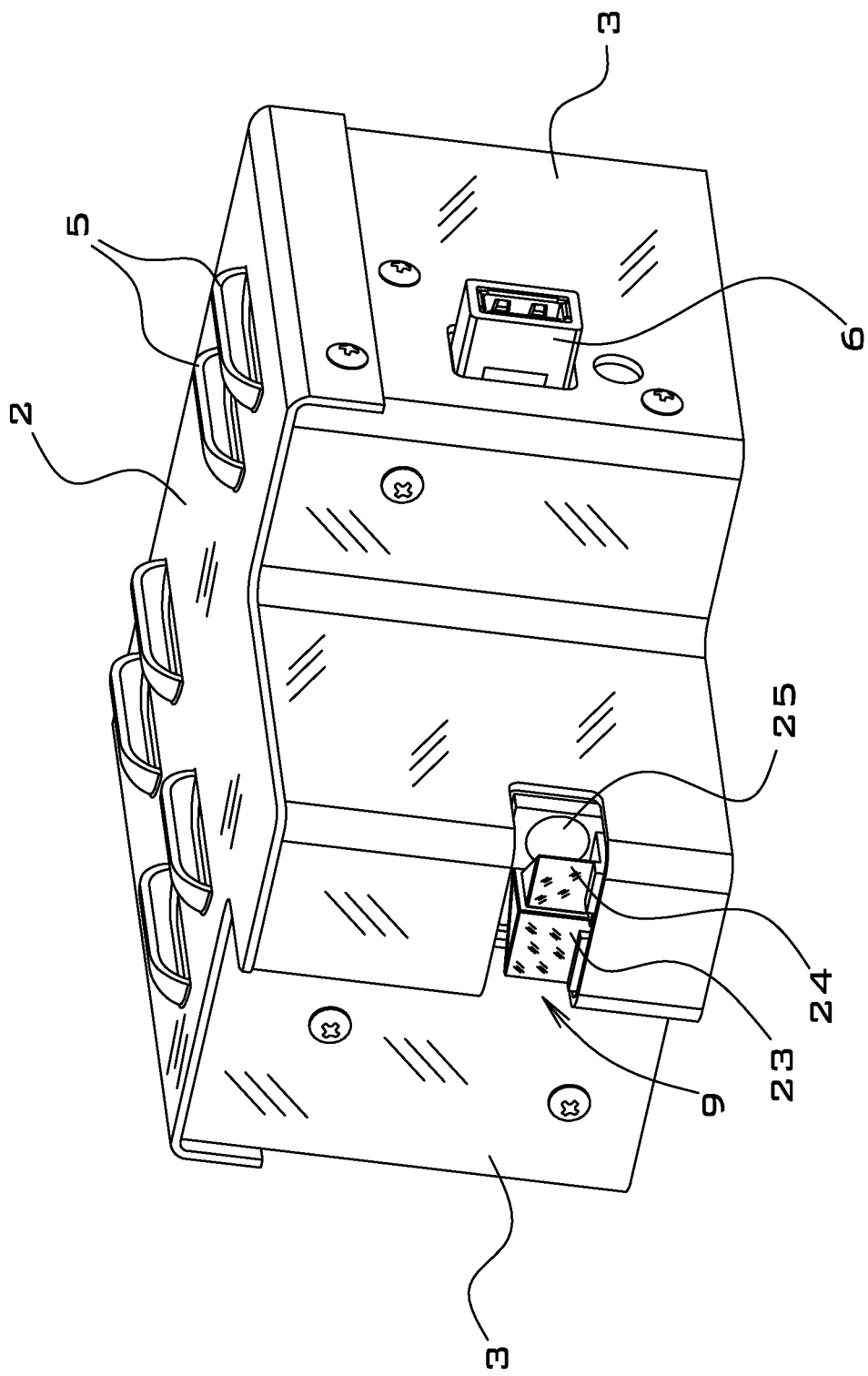
FIG. 7 is a third perspective view of the same embodiment shown in FIGS. 1 and 2.

FIG. 7 is a third perspective view of the same embodiment shown in FIGS. 1 and 2. This figure provides a clearer view of the main window 9, through which the first 23 and second 24 prisms, as well as the first fixed lens 25, can be seen. Note that the diameter of the first prism 23 is larger than the diameter of the second prism 24 because the light beam is larger in diameter by the time it hits the first prism 23. Similarly, the diameter of the MEMS mirror 20 is larger than that of the other two MEMS mirrors 18, 19 due to the larger diameter light beam.

Figure 8:
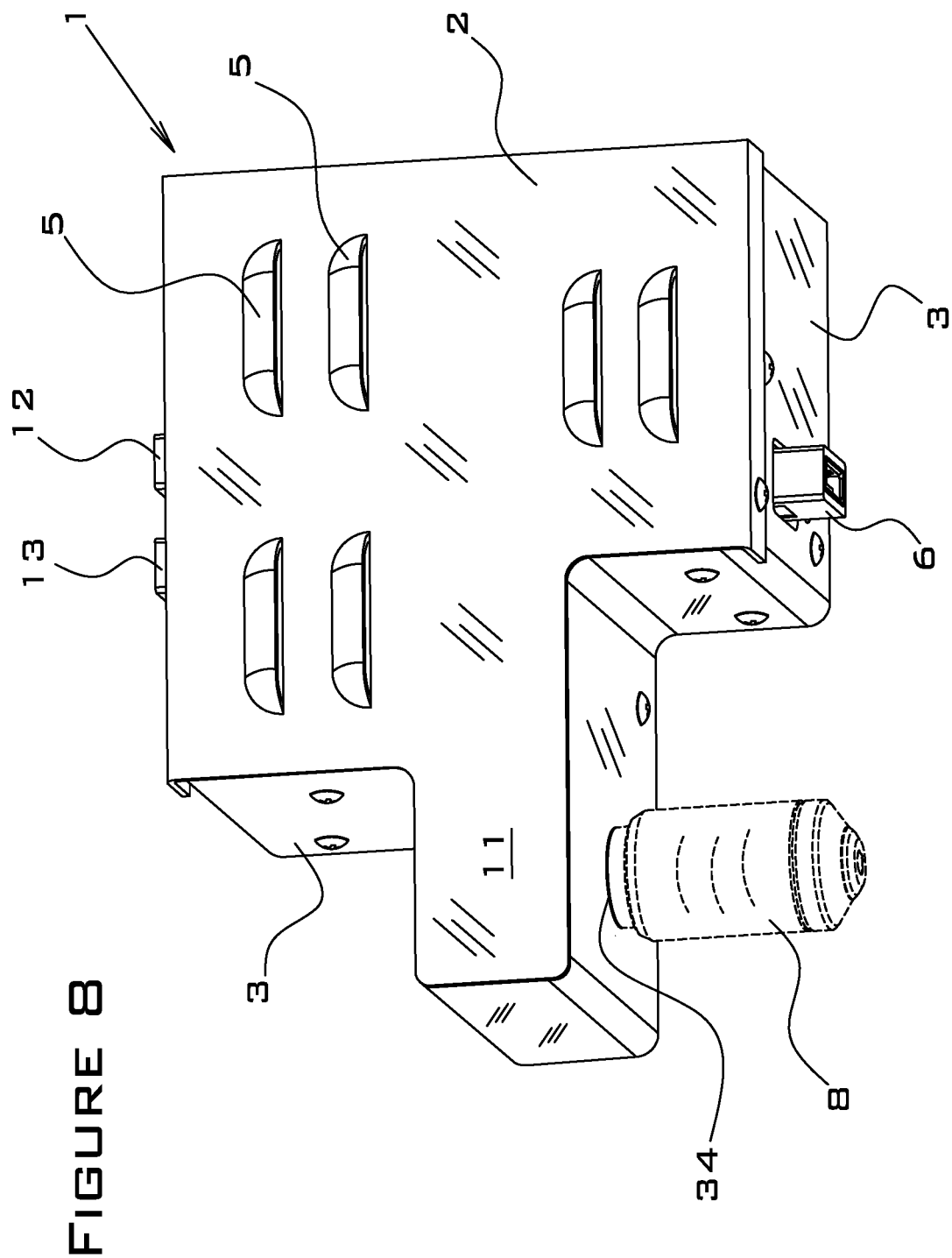
FIG. 8 is a first perspective view of a second embodiment of the present invention in which the objective lens is attached directly to the housing.
Figure 9:
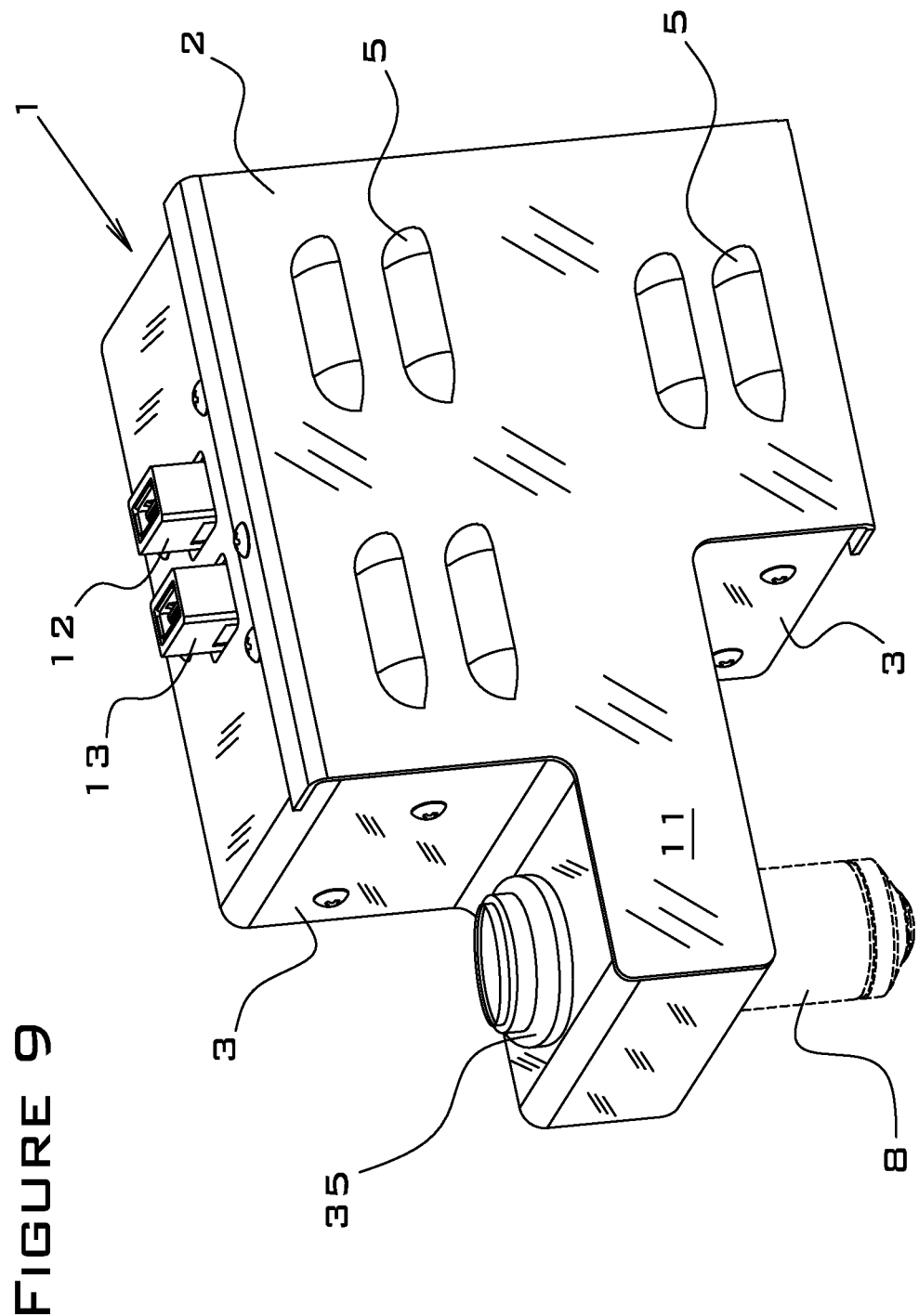
FIG. 9 is a second perspective view of the embodiment shown in FIG. 9 in which the objective lens turret is attached directly to the housing.

FIG. 8 is a first perspective view of a second embodiment of the present invention in which the objective lens is attached directly to the housing, and FIG. 9 is a second perspective view of the embodiment shown in FIG. 8 in which the objective lens turret is attached directly to the housing. In this particular embodiment, the device can be attached directly to an existing microscope. As shown, the objective lens 8 screws into the housing at position "Y" (see FIG. 6 for position designations) via a first threaded adapter 34 that is integral to the housing 1. The objective lens turret (not shown) screws into the housing at position "X" via a second threaded adapter 35 that is also integral to the housing 1. The main window 9 has been eliminated (because the objective lens and objective lens turret are screwed directly into the housing), and the extension 11 has been lengthened to accommodate the threaded adapters 34, 35, but in all other respects, the invention is as previously described.

Figure 10:
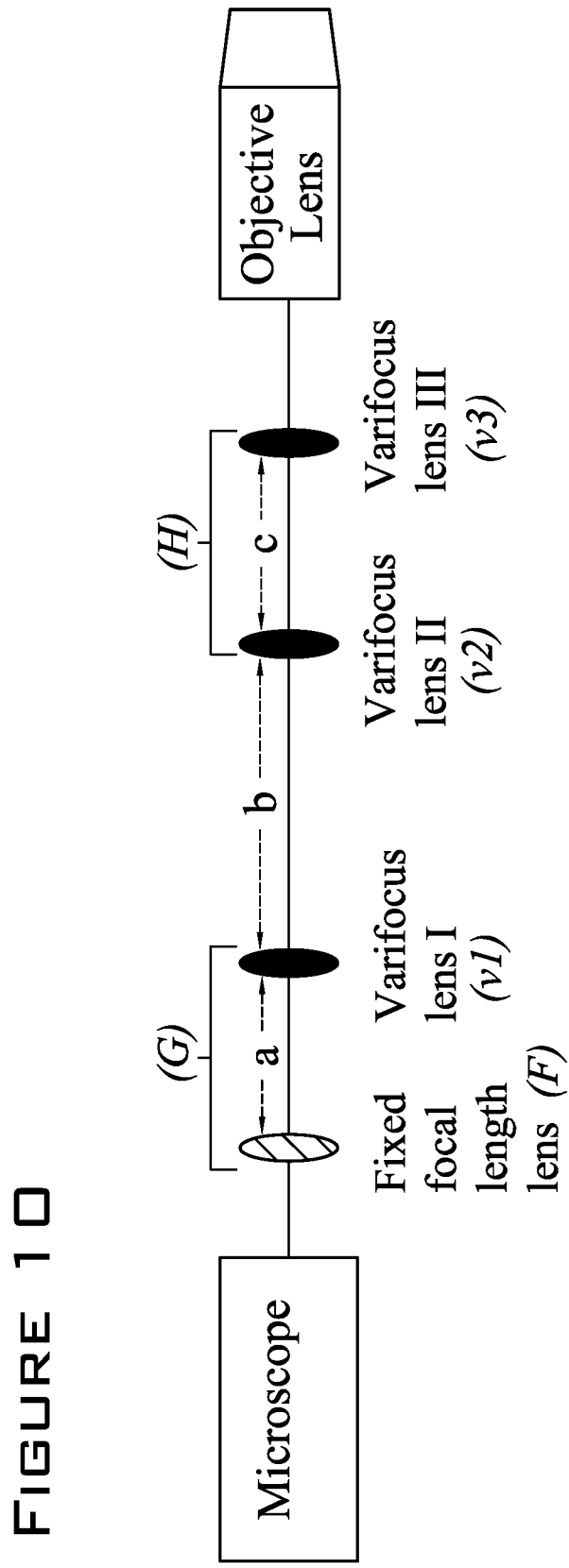
FIG. 10 is a diagram of the optical layout of the present invention.

The following discussion pertains to the equations that govern the present invention. FIG. 10 is a diagram of the optical layout of the present invention. Shown are one fixed lens F (reference number 31) and three varifocus lenses v1, v2, and v3 (reference numbers 20, 19 and 18, respectively).

Fixed lens F and varifocus lens v1 can be combined and are described as G. Varifocus lenses v2 and v3 can be combined and described as H. Distance a represents the separation between fixed focal length lens F and varifocus lens v1. Distance b defines the separation between varifocus lens v1, and varifocus lens v2. Distances b and c are positive. Distance a can be positive as shown, where it is in front of varifocus lens v1. Distance a can also be negative and behind varifocus lens v1. It is expected that the easiest and best place for F will be close to v1. Distances a and c are assumed to be sufficiently small to consider the system a two-lens relay. The equivalent focal lengths for G and H, $f_G$ and $f_H$, respectively, are:

$$f_G = \frac{f_F * f_{v1}}{f_F + f_v - a} \text{ and } f_H = \frac{f_{v2} * f_{v3}}{f_{v2} + f_{v3} - c},$$

where $f_F$, $f_{v1}$, $f_{v2}$, and $f_{v3}$ are focal lengths for lenses F, v1, v2, and v3, respectively. Assuming the distance provides infinite conjugate imaging or $b=f_G+f_H$, the magnification of the sample observed at the second alcove 10 M is:

$$M = \frac{f_G}{f_H}.$$

A 6-mm-diameter for the first MEMS mirror 18 (v3) matches the diameter of the back aperture of most 0.8 NA objective lenses on a scale of 1:1 and acts as the aperture stop to the invention. This allows for easy correction of spherical and other aberration in the system by fine control of the MEMS mirror shape. It also ensures that the aperture stop of the entire system is the full aperture of the objective lens so that resolution is maintained over the dynamic focus range.

The 6 mm MEMS mirrors can have a focal length from 60 mm to infinity. In a preferred embodiment, the first and second MEMS mirrors 18, 19 are at $f_{v2}=f_{v3}=60$ mm. The space c between them is at least 20 mm due to the size of beam splitters and waveplates. Using the equation set forth above, $f_H=(60*60)/(60+60-20)=36$ mm. For a magnification of 2, $M=f_G/36=2$ or $f_G=72$ mm. The third MEMS mirror 20 must have twice the diameter of MEMS mirrors 18, 19 for 2× magnification; therefore, its diameter is 12 mm. MEMS mirror 20 has a focal length range of 200 mm to infinity. In a preferred embodiment, the value $f_{v1}=600$ mm was chosen to reduce the optical power of fixed lens F for the case of 2× magnification to minimize introduced aberration. Typically, the more optical power a fixed lens has, the more aberration it introduces to a system. The value of 600 mm for focal length $f_{v1}$ also allows the magnification of the system to be reduced by further decreasing $f_{v1}$. To select the third fixed lens 31, it is assumed that $f_G=72$ mm, and the space a between the fixed focal length lens 31 and v1 is at least 5 mm; solving $f_G=72$ mm$=f_F*600/(fF+600-5)$, $f_G=82$. In a preferred embodiment, the distance between $f_G$ and $f_H$ is less than 100 mm to keep the overall size of the unit relatively small.

Figure 11:
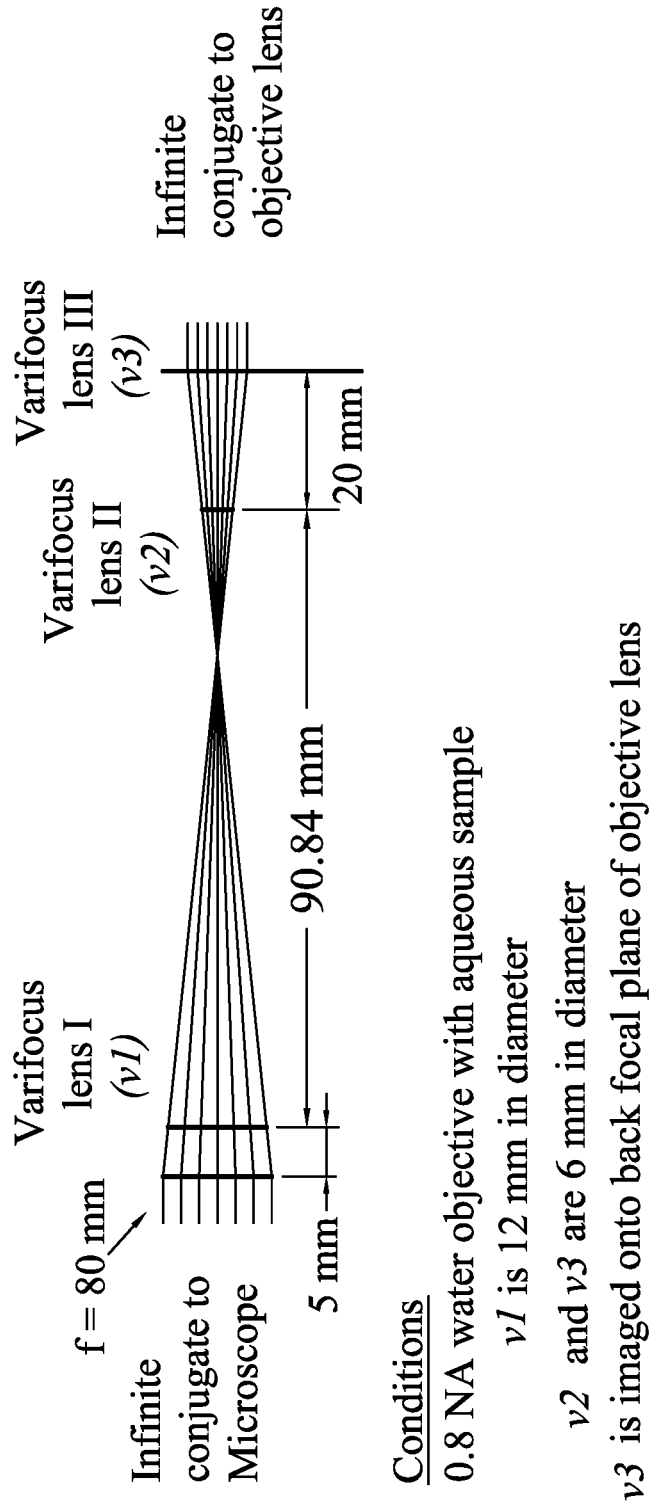
FIG. 11 is a diagram of the optical train of the present invention.

The optical train shown in FIG. 11 includes one 12 mm (v1) and two 6 mm (v2 and v3) MEMS mirrors; with reference to the above discussion of the figures, the larger MEMS mirror is the third MEMS mirror 20, and the two smaller MEMS mirrors are the first and second MEMS mirrors 18, 19. Two relay lenses (the first and second fixed lenses 25, 26) image MEMS mirror 18 (v3) onto the back focal plane of the objective lens at 1:1 scale, which allows for easy correction of spherical aberration. (The back focal plane normally lies within the objective lens, and an optical relay allows for precise placement of a conjugate image plane there.) The placement of the two fixed lenses along this relay (that is, the distance between them) depends upon the microscope with which the device is being interfaced and the power of the two relay lenses.

The system described herein was modeled in Zemax, LLC's OPTICSTUDIO® optical testing platform. Table 1 shows a few focus locations over a continuous 207-micron range in an aqueous sample at 0.8 NA. The table also shows a few magnifications possible over a continuous 1-2× range.

TABLE 1

| Configuration | vI focal length (mm) | vII focal length (mm) | vIII focal length (mm) | Focus in sample behind objective lens (mm) | Magnification |
|---|---|---|---|---|---|
| Constant 1x magnification with maximum of 207 mm change in focus | 210 | 1200 | 1200 | 5.113 | 1.1 |
| | 210 | 800 | 800 | 5.101 | 1.1 |
| | 210 | 300 | 200 | 5.012 | 1.1 |
| | 210 | 200 | 100 | 4.906 | 1.1 |
| Constant focus with maximum of 2x magnification change | 200 | 150 | 67.5 | 4.802 | 1.1 |
| | 300 | 100 | 64.5 | 4.803 | 1.4 |
| | 400 | 81 | 62 | 4.803 | 1.6 |
| | 600 | 60 | 60 | 4.801 | 2.0 |

The present invention not only enables fine control over small amounts of defocus but also provides more than 200 μm focus range at 0.8 numerical aperture or more than 800 μm 0.2 NA.

Currently, existing MEMS mirrors require around 100-150 volts to activate electronically. The MEMS mirrors may be driven with bench-top high-voltage supplies. In a preferred embodiment, a high-voltage boost converter is used to drive the MEMS mirrors from USB power.

The present invention is a vast improvement over the prior art in that it allows a lay person to perform fast focusing and zoom with a wide-field, confocal or multiphoton microscope without movement of the sample stage or objective lens. Advantages of the present invention include, but are not limited to: (a) the sample remains stationary while focusing and zoom are all done optically within the instrument; (b) there is no translation of a large mass, so systemic vibration is minimized; (c) focus and zoom can be independently controlled; (d) relatively gross (in comparison with prior art) focusing and zoom is achieved in a small form factor; (e) the back aperture of the objective lens remains filled throughout the focal and zoom range, thus maintaining high resolution imaging; (f) variable and continuous focus speed is enabled; and (g) MEMS mirrors can operate at greater than 1 kHz speed for focusing and provide fine, continuous focus control.

Future embodiments of the present invention may include voice-activated control of focus and/or zoom, a foot step button for control of zoom so that the user can keep his or her hands free, software for controlling low-order and high-order spherical aberrations with concentric rings on the MEMS mirrors, software for controlling other aberration with variable lenses that have fine asymmetric shape control, and software for autofocus during time-lapse experiments.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCE

1. Lukes, S. J., and Dickensheets, D. L., SPIE BiOS, International Society for Optics and Photonics, 2014, pp. 89490W-89411.

I claim:

1. A dynamic focus and zoom system for use with wide-field, confocal and multiphoton microscopes comprising:
   (a) a first MEMS mirror, a second MEMS mirror, and a third MEMS mirror situated within a housing;
   (b) a first universal serial bus that is situated proximate to and configured to provide a drive signal to the first MEMS mirror, a second universal serial bus that is situated proximate to and configured to provide a drive signal to the second MEMS mirror, and a third universal serial bus that is situated proximate to and configured to provide a drive signal to the third MEMS mirror;
   (c) at least one printed circuit board that is configured to control the first MEMS mirror, the second MEMS mirror, and the third MEMS mirror;
   (d) a first prism and a second prism that is situated adjacent to the first prism;
   (e) an optical relay comprised of a first fixed lens and a second fixed lens, the optical relay being situated directly behind the second prism;
   (f) a first beam splitter that is situated directly behind the second fixed lens; and
   (g) a second beam splitter that is situated in front of the second MEMS mirror;
   wherein the second prism, the first fixed lens, the second fixed lens, and the first beam splitter are aligned linearly along a longitudinal axis of the optical relay; and
   wherein the first MEMS mirror and the second MEMS mirror are linearly aligned with one another at a ninety-degree angle to the longitudinal axis of the optical relay.

2. The dynamic focus and zoom system of claim 1, wherein the housing comprises a top cover having a plurality of air vents for heat dissipation.

3. The dynamic focus and zoom system of claim 1, wherein the housing comprises a main window that is configured to allow a light beam to access the first prism and the second prism by passing through the main window.

4. The dynamic focus and zoom system of claim 1, wherein the housing is configured to form a first alcove sized to allow an objective lens to access a first side of the main window and a second alcove sized to allow an objective lens turret to access a second side of the main window.

5. The dynamic focus and zoom system of claim 1, wherein the housing is configured to form a first alcove sized to allow an objective lens to access a first side of the main window and a second alcove sized to allow a camera to access a second side of the main window.

6. The dynamic focus and zoom system of claim 1, wherein the housing is configured to form a first alcove sized to allow an objective lens to access a first side of the main window and a second alcove sized to allow an eyepiece to access a second side of the main window.

7. The dynamic focus and zoom system of claim 1, wherein the first fixed lens and the second fixed lens are slidably mounted within a slot in a floor of the housing.

8. The dynamic focus and zoom system of claim 3, wherein the third MEMS mirror is situated proximate to the main window.

9. The dynamic focus and zoom system of claim 1, further comprising a third fixed lens.

10. The dynamic focus and zoom system of claim 9, further comprising a first wave plate that is situated between the first beam splitter and the first MEMS mirror and a second wave plate that is situated between the second beam splitter and the second MEMS mirror.

11. The dynamic focus and zoom system of claim 10, further comprising a third wave plate that is situated directly in front of the third fixed lens.

12. The dynamic focus and zoom system of claim 11, further comprising a third beam splitter that is situated directly in front of the third wave plate and a third prism, that is situated directly in front of the third beam splitter.

13. The dynamic focus and zoom system of claim 12, wherein the third MEMS mirror, the third fixed lens, the third wave plate, the third beam splitter and the third prism are linearly aligned with one another at a ninety-degree angle to the longitudinal axis of the optical relay.

14. The dynamic focus and zoom system of claim 12, wherein the third prism abuts up against a center section of the optical relay between the first fixed lens and the second fixed lens; and
   wherein the third prism is linearly aligned with the first prism such that the linear alignment of the first prism and the third prism is parallel to the longitudinal axis of the optical relay.

15. The dynamic focus and zoom system of claim 9, wherein the third fixed lens is situated directly in front of the third MEMS mirror.

16. The dynamic focus and zoom system of claim 12, wherein the third fixed lens is positioned between the first prism and the third prism.

17. The dynamic focus and zoom system of claim 12, wherein the third fixed lens is positioned between the second beam splitter and the third beam splitter.

18. The dynamic focus and zoom system of claim 12, wherein the first beam splitter, the second beam splitter, and the third beam splitter are polarizing beam splitters.

19. The dynamic focus and zoom system of claim 1, wherein there is a first distance between the first MEMS mirror and the second MEMS mirror, wherein there is a second distance between the second MEMS mirror and the third MEMS mirror, and wherein the first distance is less than the second distance.

20. The dynamic focus and zoom system of claim 6, wherein the first alcove comprises a first threaded adapter that is integral to the housing and configured to receive an objective lens.

21. The dynamic focus and zoom system of claim 6, wherein the second alcove comprises a second threaded adapter that is integral to the housing and configured to receive an objective lens turret, a camera or an eyepiece.

22. A dynamic focus and zoom system for use with wide-field, confocal and multiphoton microscopes comprising:
   (a) a first MEMS mirror, a second MEMS mirror, and a third MEMS mirror situated within a housing;
   (b) a first prism and a second prism that is situated adjacent to the first prism;

(c) an optical relay comprised of a first fixed lens and a second fixed lens, the optical relay being situated directly behind the second prism;
(d) a first beam splitter that is situated directly behind the second fixed lens; and
(e) a second beam splitter that is situated in front of the second MEMS mirror;
wherein the second prism, the first fixed lens, the second fixed lens, and the first beam splitter are aligned linearly along a longitudinal axis of the optical relay; and
wherein the first MEMS mirror and the second MEMS mirror are linearly aligned with one another at a ninety-degree angle to the longitudinal axis of the optical relay.

23. The dynamic focus and zoom system of claim 22, wherein the housing comprises a top cover having a plurality of air vents for heat dissipation.

24. The dynamic focus and zoom system of claim 22, wherein the housing comprises a main window that is configured to allow a light beam to access the first prism and the second prism by passing through the main window.

25. The dynamic focus and zoom system of claim 22, wherein the housing is configured to form a first alcove sized to allow an objective lens to access a first side of the main window and a second alcove sized to allow an objective lens turret to access a second side of the main window.

26. The dynamic focus and zoom system of claim 22, wherein the housing is configured to form a first alcove sized to allow an objective lens to access a first side of the main window and a second alcove sized to allow a camera to access a second side of the main window.

27. The dynamic focus and zoom system of claim 22, wherein the housing is configured to form a first alcove sized to allow an objective lens to access a first side of the main window and a second alcove sized to allow an eyepiece to access a second side of the main window.

28. The dynamic focus and zoom system of claim 22 wherein the first fixed lens and the second fixed lens are slidably mounted within a slot in a floor of the housing.

29. The dynamic focus and zoom system of claim 22, wherein the third MEMS mirror is situated proximate to the main window.

30. The dynamic focus and zoom system of claim 22, further comprising a third fixed lens.

31. The dynamic focus and zoom system of claim 30, further comprising a first wave plate that is situated between the first beam splitter and the first MEMS mirror and a second wave plate that is situated between the second beam splitter and the second MEMS mirror.

32. The dynamic focus and zoom system of claim 31, further comprising a third wave plate that is situated directly in front of the third fixed lens.

33. The dynamic focus and zoom system of claim 32, further comprising a third beam splitter that is situated directly in front of the third wave plate and a third prism that is situated directly in front of the third beam splitter.

34. The dynamic focus and zoom system of claim 33, wherein the third MEMS mirror, the third fixed lens, the third wave plate, the third beam splitter and the third prism are linearly aligned with one another at a ninety-degree angle to the longitudinal axis of the optical relay.

35. The dynamic focus and zoom system of claim 33, wherein the third prism abuts up against a center section of the optical relay between the first fixed lens and the second fixed lens; and wherein the third prism is linearly aligned with the first prism such that the linear alignment of the first prism and the third prism is parallel to the longitudinal axis of the optical relay.

36. The dynamic focus and zoom system of claim 30, wherein the third fixed lens is situated directly in front of the third MEMS mirror.

37. The dynamic focus and zoom system of claim 33, wherein the third fixed lens is positioned between the first prism and the third prism.

38. The dynamic focus and zoom system of claim 33, wherein the third fixed lens is positioned between the second beam splitter and the third beam splitter.

39. The dynamic focus and zoom system of claim 33, wherein the first beam splitter, the second beam splitter, and the third beam splitter are polarizing beam splitters.

40. The dynamic focus and zoom system of claim 22, wherein there is a first distance between the first MEMS mirror and the second MEMS mirror, wherein there is a second distance between the second MEMS mirror and the third MEMS mirror, and wherein the first distance is less than the second distance.

41. The dynamic focus and zoom system of claim 27, wherein the first alcove comprises a first threaded adapter that is integral to the housing and configured to receive an objective lens.

42. The dynamic focus and zoom system of claim 27, wherein the second alcove comprises a second threaded adapter that is integral to the housing and configured to receive an objective lens turret, a camera or an eyepiece.

43. A dynamic focus and zoom system for use with wide-field, confocal and multiphoton microscopes comprising:
(a) a first MEMS mirror, a second MEMS mirror, and a third MEMS mirror situated within a housing;
(b) a first prism;
(c) an optical relay comprised of a first fixed lens and a second fixed lens, the optical relay being situated directly behind the first prism;
(d) a first beam splitter that is situated directly behind the second fixed lens; and
(e) a second beam splitter that is situated in front of the second MEMS mirror;
wherein the first prism, the first fixed lens, the second fixed lens, and the first beam splitter are aligned linearly along a longitudinal axis of the optical relay; and
wherein the first MEMS mirror and the second MEMS mirror are linearly aligned with one another at a ninety-degree angle to the longitudinal axis of the optical relay.

44. A dynamic focus and zoom system for use with wide-field, confocal and multiphoton microscopes comprising:
(a) a first MEMS mirror, a second MEMS mirror, and a third MEMS mirror situated within a housing;
(b) an optical relay comprised of a first fixed lens and a second fixed lens;
(c) a first prism that is situated offset from a first end of the optical relay;
(d) a first beam splitter that is situated directly behind the second fixed lens; and
(e) a second beam splitter that is situated in front of the second MEMS mirror;
wherein the first fixed lens, the second fixed lens, and the first beam splitter are aligned linearly along a longitudinal axis of the optical relay; and wherein the first MEMS mirror and the second MEMS mirror are linearly aligned with one another at a ninety-degree angle to the longitudinal axis of the optical relay.

\* \* \* \* \*